United States Patent [19]

Naus

[11] 4,108,493
[45] Aug. 22, 1978

[54] LOCOMOTIVE CAB SEAT

[76] Inventor: Glen L. Naus, Rte. 3, Holiday Lake, Willard, Ohio 44890

[21] Appl. No.: 776,285

[22] Filed: Mar. 10, 1977

[51] Int. Cl.² .......................... A47C 3/18; A47C 7/54
[52] U.S. Cl. .................................. 297/337; 297/417; 297/411
[58] Field of Search ............... 297/337, 417, 411, 412, 297/116, 115

[56] References Cited

U.S. PATENT DOCUMENTS

| 535,168 | 3/1895 | Krehbiel | 297/417 X |
| 2,766,463 | 10/1956 | Bendersky | 297/411 X |
| 2,767,778 | 10/1956 | Kriger et al. | 297/417 X |
| 2,858,876 | 11/1958 | Woodson | 297/417 X |
| 2,935,120 | 5/1960 | Naus | 297/337 |
| 3,322,463 | 5/1967 | Neak et al. | 297/417 |
| 3,829,159 | 8/1974 | Leffler | 297/417 |

FOREIGN PATENT DOCUMENTS 793,883  4/1958  United Kingdom .................... 297/115

*Primary Examiner*—Francis K. Zugel
*Attorney, Agent, or Firm*—Watts, Hoffmann, Fisher & Heinke Co.

[57] ABSTRACT

A locomotive cab seat includes a rotatable seat portion; a fixed backrest adjacent the seat portion; a first armrest having a generally vertically disposed, planar side portion; and a second, vertically adjustable armrest on the side of the seat portion generally opposite the first armrest. The first armrest is mounted pivotally so as to be capable of being urged toward the sidewall of the locomotive cab, and the second armrest includes an adjustment mechanism whereby the second armrest may be maintained in a raised position or may be moved conveniently to a lowered position.

3 Claims, 5 Drawing Figures

LOCOMOTIVE CAB SEAT

BACKGROUND OF THE INVENTION

1. Field of the Invention

The invention relates to locomotive cab seats and, more particularly, to a locomotive cab seat having a pair of adjustable armrests.

2. Description of the Prior Art

A widely used prior art locomotive cab seat is shown by U.S. Pat. No. 2,935,120, issued to the patentee of the present invention. That patent discloses a seat and backrest combination wherein a rotatable seat portion is carried by a support affixed rigidly to the floor of the cab. A backrest is affixed to the support such that the backrest may be pivoted rearwardly but may not be swiveled. The backrest includes a cut-out section to provide room for a portion of the operator's leg in order to permit the operator to face rearwardly to control the operation of the locomotive when the locomotive is being backed. The rotatable seat portion and the backrest may be adjusted independently of each other in various directions to permit the seat to fit different operators.

The locomotive cab seat according to U.S. Pat. No. 2,935,120 is widely used in the American locomotive industry. Although this seat functions quite well and reliably, it has become desirable to provide additional features of comfort and flexibility. For example, the seat commonly is disposed adjacent the sidewall of the locomotive cab. In this position, the operator may look through the window conveniently to better control operation of the locomotive. Unfortunately, the operator must sit immediately beside the sidewall of the locomotive cab. Vibration sometimes can be excessive and, particularly in the wintertime, unpleasant temperature effects may be transmitted to the operator. Moreover, an airflow usually is established close to the sidewall such that the operator often is discomforted by objectionable air currents.

When the locomotive is being driven a long distance without stops, the operator rarely needs to swivel the seat portion to face rearwardly. Accordingly, an armrest on the side of the seat opposite the sidewall is desirable to increase the operator's comfort and prevent his becoming fatigued. However, when the locomotive is being operated in a yard, the operator needs to turn frequently and rapidly from front-to-rear and back again as the locomotive is moved back-and-fourth. Heretofore, it has been impractical to provide an armrest on the side of the seat opposite the sidewall because, although it clearly would be beneficial for long-distance trips, it would be completely unacceptable for operation of the locomotive during yard work.

SUMMARY OF THE INVENTION

The present invention provides a locomotive cab seat having advantages over prior art cab seats, including that of U.S. Pat. No. 2,935,120. The seat is adapted especially for use in a locomotive cab having a sidewall with the seat being disposed adjacent the sidewall. The seat includes a rotatable seat portion and a backrest tiltable with respect to the seat portion and disposed adjacent the seat portion.

A first armrest having a generally vertically disposed planar portion is positioned adjacent the seat portion and the sidewall. A second, vertically adjustable armrest is disposed adjacent the seat portion on the side of the seat portion generally opposite the first armrest.

The first armrest is carried by a frame and the frame is pivotally mounted about an axis extending substantially in the plane of the locomotive sidewall. A displaceable member is disposed intermediate the support and a non-movable member so that the first armrest may be urged toward the sidewall.

The second armrest is carried by a support. The support is slidably engaged by a sleeve having a notch in its upper periphery. The support includes a lug which engages the notch to maintain the second armrest in a raised position to support the operator's arm. The lug may slide through the sleeve to permit the second armrest to be moved to a lowered position where the upper surface of the second armrest is approximately flush with the upper surface of the seat portion.

By this construction, when in a forward-facing position, the operator is isolated from vibration and termperature effects as well as from air currents flowing near the sidewall. The second armrest provides support for the operator's arm and when the operator needs to face rearwardly, the second armrest may be moved conveniently to its lowered position so that the operator may swivel the seat without interference. Also, with the operator in the rearwardly facing position, the first armrest provides support for a portion of the operator's legs.

DESCRIPTION OF THE PREFERRED EMBODIMENT

Figure 1:
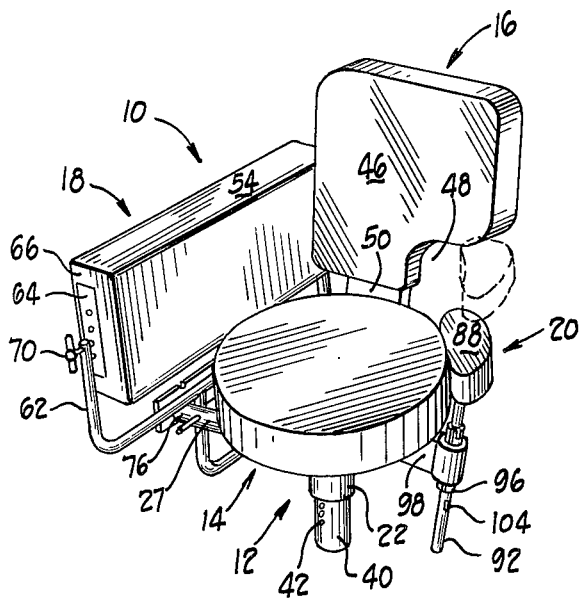
FIG. 1 is a perspective view of a locomotive cab seat according to the invention with the second armrest shown in the lowered position, and with the dotted lines showing the second armrest in the raised position.

A locomotive cab seat 10 is shown in FIG. 1. The seat 10 is comprised of several subassemblies, including a support structure 12, a seat portion 14, a backrest 16, a first armrest 18, and a second armrest 20. The subassemblies will be described one-by-one.

The Support Structure

The support structure 12 includes a generally vertically extending cylinder 22 affixed to a sidewall 24 of the locomotive cab by means of a plurality of tubing members 26. The upper tubing members 26, when viewed from above, form a yoke 27 attached at one end to the cylinder 22 and attached at the other end to the sidewall 24. The attachment to the cylinder 22 is made by welds and the attachment to the sidewall is made by flared portions 28 which engage a track 30 rigidly affixed to the sidewall 24.

Vertical support for the cylinder 22 is provided by an inclined tubular member 32 affixed to the cylinder 22 by welds and inserted at its other end 34 into one of a number of openings 36 in the sidewall 24. The end 34 of the tube 32 is shaped appropriately to fit snugly within the openings 36. By this construction, the cylinder 22 is simply and securely maintained a fixed distance from the floor and the sidewall 24. The cylinder 22 may be moved fore-and-aft by lifting the cylinder 22 enough so that the tube 32 disengages the openings 36 and thereafter sliding the cylinder 22 along the track 30 to the desired new location.

The Seat Portion

The seat portion 14 is comprised of a disk-like, padded structure rotatable about an axis taken through its center, the axis extending orthogonally to the upper surface 38 of the seat portion 14. In all essential respects, the seat portion 14 is identical structurally and functionally to the seat portion disclosed in U.S. Pat. No. 2,935,120, the disclosure of which is incorporated herein by reference.

In order to effectively operate the locomotive, the operator must be able to change from a forwardly facing position to a generally rearwardly facing position within a short period of time. Accordingly, the seat portion 14 is mounted for rotation. Again, reference may be had to U.S. Pat. No. 2,935,120 for the details of the structure which permits the seat portion 14 to rotate. The seat portion 14 also is adjustable vertically to permit different operators to operate the locomotive conveniently. A spindle 40 extends downwardly of the seat portion 14 and is vertically adjustable within the cylinder 22. The spindle includes a plurality of openings 42 which may be selectively aligned with a slot 44 in the upper periphery of the cylinder 22. A pin may be inserted through one of the openings 42 to permit the seat portion 14 to be fixed at a desired height. By this construction, the entire seat may be lifted out of the cylinder 22 and turned 180° without affecting the vertical adjustment of the seat portion 14. This feature is advantageous when the locomotive is being operated for long periods of time in one direction and it then becomes desirable to face in the direction of travel.

The Backrest

The backrest 16, like the seat portion 14, substantially is identical both structurally and functionally to the backrest disclosed in U.S. Pat. No. 2,935,120. For example, various adjustments may be made to adapt the backrest 16 to different operators. The backrest 16 includes a padded portion 46 to support an operator's back and cut-out section 48 to receive a portion of an operator's leg and permit the operator to face generally rearwardly upon rotation of the seat portion 14.

A backrest frame 50 is shown partially in FIG. 1. The backrest frame mounts the backrest 16 to support structure 12 and permits the padded portion 46 to be tilted rearwardly when engaged by an operator. Because the backrest frame 50 is connected to the support structure 12, the backrest 16 cannot rotate about the cylinder 22.

The First Armrest

The first armrest 18 is of box-like, generally rectangular construction and preferably is padded in a manner similar to the seat portion 14 and the backrest 16. The first armrest 18 is positioned intermediate the sidewall 24 and the seat portion 14 and includes a generally vertically disposed planar side portion 52 against which the operator may rest his side or back. The armrest 18 also includes a generally horizontally disposed, planar top portion 54 upon which the operator may rest his arm.

The armrest 18 is carried by a support or frame 56. The support 56 includes a first, generally U-shaped tubular member 58 having an opening 60 near the end of each upwardly extending leg 62. The armrest 18 includes a plate 64 affixed to each end wall 66, each plate 64 including a plurality of openings 68. A pin 70 extends through each opening 60 and into one of the openings 68 in each plate 64. By this construction, the armrest 18 may be adjusted vertically as desired.

A second, generally U-shaped tubular member 72 extends downwardly of the first tubular member 58. The second tubular member 72 is affixed to a lower, central portion of the tubular member 58 by means of welds indicated at 74. The tubular member 72 is sized appropriately to fit downwardly into the yoke 27. A pin 76 extends through openings 78 in the yoke 27 and through openings in the tubular member 72. This construction provides a pivotal mounting for the armrest support 56 and, hence, the armrest 18, whereby the armrest 18 may be urged toward the sidewall 24. The pivotal axis of the armrest 18 substantially is in the plane of the sidewall 24.

In order to urge the armrest 18 toward the sidewall 24, a displaceable member 78 is operatively disposed intermediate the armrest support 56 and a non-movable member such as the sidewall 24. The displaceable member 78 comprises a threaded rod 80 extending through a threaded opening 82 in the lower portion of the second tubular member 72. The threaded rod 80 includes a foot 84 which engages the sidewall 24 and a handle 86 by which the threaded rod 80 may be rotated. By appropriate adjustment of the threaded rod 80, the first armrest 18 may be pivoted about the pin 76 to position the first armrest 18 as desired. Alternatively, the displaceable member may comprise a spring or other extensible member capable of urging the first armrest 18 toward the sidewall 24.

The Second Armrest

Figure 2:
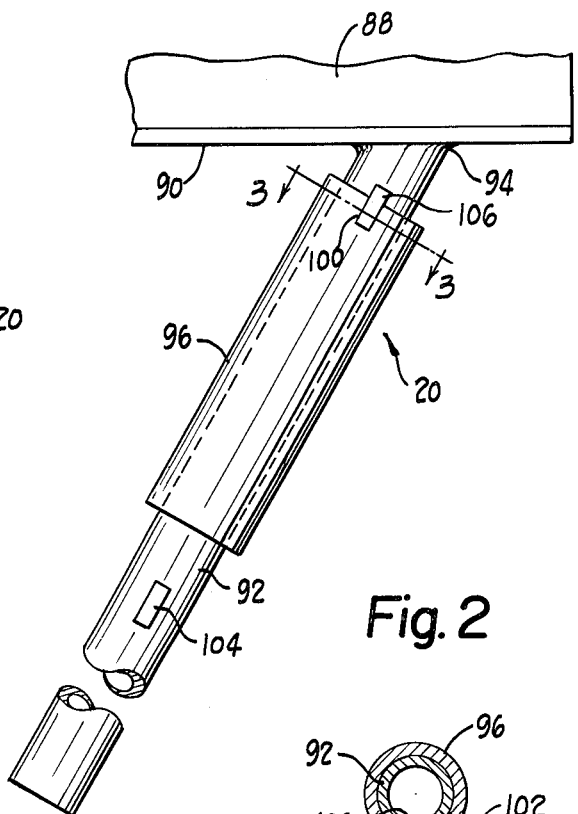
FIG. 2 is a view of the vertical adjustment mechanism for the second armrest.

The second armrest 20 is comprised of a kidney-shaped padded portion 88 supported on a planar surface 90. A tubular support 92 extends downwardly of the planar surface 90 at an oblique angle as shown in FIG. 2. The tubular support 92 is affixed to the underside of the planar surface 90 as by welds indicated at 94.

In order to permit the second armrest to be adjusted vertically, the support 92 is disposed for movement within a sleeve 96. In turn, the sleeve 96 is carried by an outwardly extending arm 98 affixed at its inner end to the support structure 12. Hence, the arm 98 is rigidly maintained a fixed distance from the floor and from the seat portion 14. Because the support 92 extends downwardly from the underside of the planar surface 90 at an angle, the support 92 provides little interference with an operator's leg which may slide over the outside edge of the padded portion 88.

The sleeve 96 includes a notch 100 in its upper periphery and a longitudinally extending slot 102 running its length. A first lug 104 is affixed to and extends outwardly of the support 92 near a lower portion of the support 92. A second lug 106 is affixed to and extends outwardly of the support 92 near an upper portion of the support 92. The lug 104 is sized appropriately so that it may slide through the slot 102 and both the lugs 104 and 106 are sized so that they may rest within the notch 100.

Figure 3:
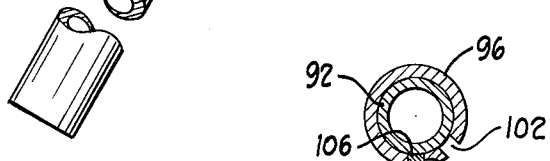
FIG. 3 is a view taken along line 3—3 of FIG. 2 and showing in more detail the mechanism by which the second armrest is raised and lowered.
Figure 4:
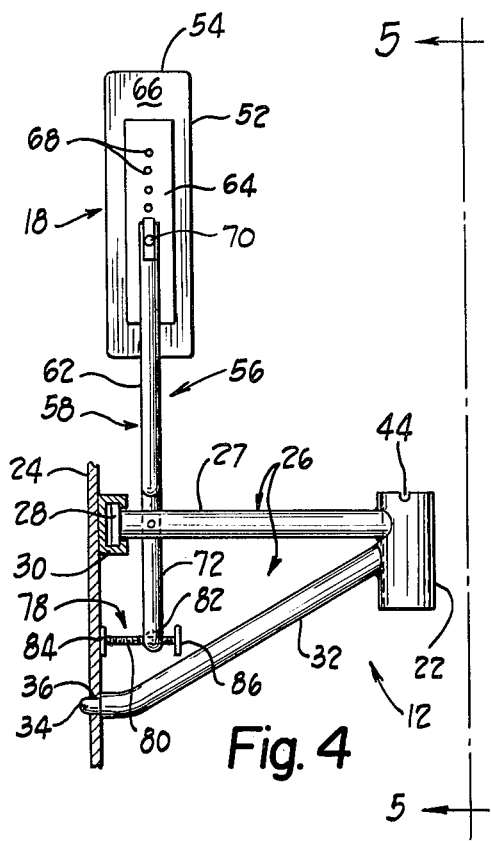
FIG. 4 is a front view with the seat portion and backrest removed showing the mounting for the first armrest.
Figure 5:
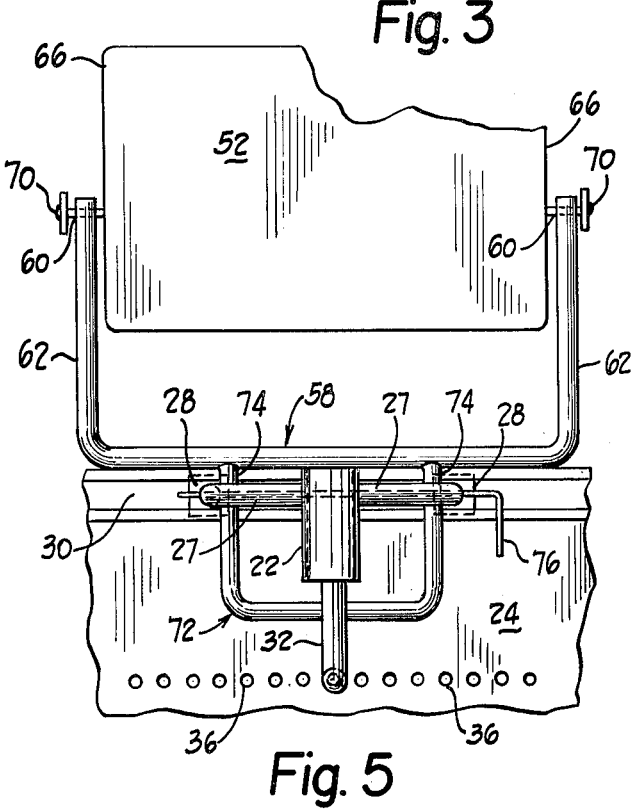
FIG. 5 is a view taken along line 5—5 of FIG. 4 and showing in more detail the mounting for the first armrest.

Referring now to FIGS. 1 and 3, when it is desired to maintain the second armrest 20 in the raised position, the armrest 20 is pulled upwardly and the lug 104 slides through the slot 102 until the lug 104 clears the upper edge of the sleeve 96. The armrest 20 then is rotated slightly toward the front of the cab until the lug 104 engages the notch 100. Provided the armrest 20 thereafter is not raised and rotated rearwardly, the armrest 20 will be maintained in the raised position.

When it is desired to move the armrest 20 to its lowered position, as, for example, when the operator wishes to rotate the seat portion 14 and face generally rearwardly, the operator may contact the underside of the armrest 20 with his knee. The armrest 20 then will be raised slightly and rotated until the lug 104 is aligned with the slot 102, whereupon the armrest 20 may be lowered to that position shown in FIG. 1.

Due to the kidney-like shape of the padded portion 88, the armrest 20 conforms generally to the shape of the disk-like seat portion 14 and rotation of the seat portion 14 is permitted without interference. Because the lug 106 engages the notch 100 when the armrest 20 is in the lowered position, the armrest 20 is maintained in proper alignment with respect to the seat portion 14. Also, because the upper surface of the armrest 20 is approximately flush with the upper surface 38 of the seat portion 14, the operator may freely move from a forwardly facing position to a rearwardly facing position without interference. The padded portion 88 also provides additional support for the operator's leg when the operator is in a rearwardly facing position. Of course, when the operator is in a forwardly facing position and the second armrest 20 is in a raised position, the operator's arm is supported adequately.

It will be appreciated that the locomotive cab seat according to the present invention provides a sturdy and reliable seat having advantages unknown in the prior art. The first armrest can be adjusted both vertically and laterally to accommodate different operators. The first armrest 18 effectively insulates the operator from vibration in the sidewall 24 and from temperature effects of the sidewall 24. The first armrest 18 also shields the operator from air currents flowing near the sidewall 24. The first armrest 18 is sized appropriately to support a portion of the side of the operator's leg and his arm when the operator is in a forward-facing position and to support a portion of the operator's back when the operator is in a sideways-facing position.

Because the second armrest 20 can be vertically adjusted conveniently and rapidly, the seat provides maximum support for the operator both in a forwardly facing position and in a rearwardly facing position with a minimum of inconvenience and trouble. The vertical adjustment mechanism for the second armrest 20 is very sturdy and is very reliable because there are only two parts having relative motion.

While a specific embodiment of the invention has been described, it will be obvious to those skilled in the art that changes and modifications may be made without departing from the invention. It therefore is intended in the appended claims to cover all such changes and modifications that fall within the true spirit and scope of the invention.

I claim:

1. In a locomotive cab seat assembly including a rotatable seat portion and a backrest, the seat portion being mounted for rotation independently of the backrest and the backrest being shaped to permit an operator to rotate the seat portion to a sideways-facing position with respect to the backrest, the improvement comprising:
   (a) a vertically movable armrest movable between a raised position for supporting an arm of the operator when the operator is facing forwardly and a lowered position for permitting the operator to rotate the seat portion to the sideways-facing position;
   (b) support means for supporting the armrest independently of the seat portion so that the seat portion can rotate while the armrest is stationary, the support means including cooperating structure for releasably holding the armrest in the raised position, the cooperating structure being releasable by the operator so that the armrest can be moved to the lowered position;
   (c) a second armrest disposed adjacent the seat portion, the second armrest having an upper, arm-supporting surface and a side surface extending from the upper surface to near the seat portion so that the side surface supports the operator's back when the operator is in the sideways-facing position; and
   (d) support means for adjustably supporting the second armrest independently of the seat portion, whereby the seat portion can rotate while the second armrest is stationary.

2. The improvement of claim 1, wherein the cooperating structure comprises:
   (a) first and second members comprising a sleeve and a relatively movable rod, one of the members being fixed in a vertical position and the other member being connected to the armrest;
   (b) a lug fixed to and extending outwardly of the first member; and
   (c) a generally vertically extending slot and a lateral notch in the second member, the notch adapted to receive the lug to maintain the armrest in the raised position and the slot adapted to receive the lug to permit the armrest to be moved between the raised and lowered positions, the notch and the slot being angularly displaced so that rotation of the lug, and hence the armrest, is required to permit the armrest to be lowered from the raised position.

3. The improvement of claim 1, wherein the support means for the second armrest comprises:
   (a) a pivotal mounting for the armrest; and
   (b) a displaceable member connected to the pivotal mounting, the displaceable member serving to pivot the armrest away from the seat portion.

* * * * *

UNITED STATES PATENT AND TRADEMARK OFFICE
CERTIFICATE OF CORRECTION

PATENT NO. : 4,108,493
DATED : August 22, 1978
INVENTOR(S) : GLEN L. NAUS

It is certified that error appears in the above-identified patent and that said Letters Patent are hereby corrected as shown below:

Column 1, line 50, change "fourth" to -- forth --;

Column 2, line 54, before "The", insert -- 1. --;

Column 3, line 9, before "The", insert -- 2. --;

line 40, before "The", insert -- 3. --;

line 56, before "The", insert -- 4. --;

Column 4, line 36, before "The", insert -- 5. --.

Signed and Sealed this

Twentieth Day of March 1979

[SEAL]

Attest:

RUTH C. MASON
Attesting Officer

DONALD W. BANNER
Commissioner of Patents and Trademarks